(12) United States Patent
Maekawa et al.

(10) Patent No.: US 8,471,695 B2
(45) Date of Patent: Jun. 25, 2013

(54) TIRE AIR PRESSURE MONITORING DEVICE

(75) Inventors: Takahiro Maekawa, Sagamihara (JP); Syoji Terada, Hiratsuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 184 days.

(21) Appl. No.: 13/195,217

(22) Filed: Aug. 1, 2011

(65) Prior Publication Data

US 2012/0025968 A1 Feb. 2, 2012

(30) Foreign Application Priority Data

Aug. 2, 2010 (JP) ................................. 2010-173455

(51) Int. Cl.
*B60C 23/00* (2006.01)

(52) U.S. Cl.
USPC .............................. 340/444; 340/442; 73/146

(58) Field of Classification Search
USPC .......................... 340/442–448; 73/146–146.8
See application file for complete search history.

(56) References Cited

U.S. PATENT DOCUMENTS

| 6,278,363 | B1 * | 8/2001 | Bezek et al. | 340/442 |
| 7,289,022 | B2 * | 10/2007 | Ogawa et al. | 340/447 |
| 7,334,463 | B2 * | 2/2008 | Lin | 73/146.4 |
| 7,506,540 | B1 * | 3/2009 | Job | 340/447 |
| 7,930,132 | B2 * | 4/2011 | Watasue | 340/444 |
| 2004/0246117 | A1 * | 12/2004 | Ogawa et al. | 340/445 |
| 2009/0204361 | A1 * | 8/2009 | Watasue | 702/141 |
| 2010/0010770 | A1 * | 1/2010 | Helck | 702/141 |

FOREIGN PATENT DOCUMENTS

JP 2000-062420 2/2000

* cited by examiner

*Primary Examiner* — Eric M Blount
(74) *Attorney, Agent, or Firm* — Drinker Biddle & Reath LLP

(57) ABSTRACT

A tire air pressure monitoring device for monitoring the air pressure of a tire on a vehicle having two or more tires, including an air pressure sensing device that senses air pressure information of the tire and is adapted to be mounted at a prescribed position on the tire so as to rotate with the tire, a transmitting device that transmits the sensed air pressure information, a rotary position sensing device that senses the rotary position of the air pressure sensing device as the tire rotates, a period of rotation calculating device that calculates the period of rotation of the tire, a period of rotation disruption sensing device that senses disruption in the period of rotation based on a change in the period, and a transmission control device that outputs commands to transmit the air pressure information to the transmitting device based on a disruption in the period of rotation.

10 Claims, 12 Drawing Sheets

TIRE AIR PRESSURE MONITORING DEVICE

CROSS-REFERENCE TO RELATED APPLICATIONS

This application claims priority under 35 U.S.C. §119 to Japanese Patent Application No. 2010-173455, filed on Aug. 2, 2010, which is incorporated by reference herein in its entirety.

BACKGROUND OF THE INVENTION

1. Field of Invention

The present invention relates to a tire air pressure monitor device.

2. Description of Related Art

In existing devices, the air pressure in the tires mounted on a vehicle is sensed with air pressure sensors, and the air pressure information that is sensed is transmitted to a receiver. Because vehicles are provided with multiple tires, when multiple transmitters transmit air pressure information simultaneously, the transmitted signals collide, and the air pressure information for multiple tires cannot be accurately received by the receiver. Prior attempts to reduce such collisions by the transmitted signals have included adjusting the transmission timing from multiple transmitters by having the transmitters generate pseudorandom numbers. However, this approach adds complexity and cost to each of the transmitters.

SUMMARY OF THE INVENTION

An objective of the present invention is to reduce collisions between transmitted signals from multiple transmitters without adding complexity to the transmitters themselves. Therefore, a tire air pressure monitoring device is disclosed that transmits tire air pressure information from a transmitter when a disruption or disturbance of the tire rotation is sensed.

According to the present invention, the time at which a disruption of the period of rotation will vary between the front and rear tires, or the left and right tires, so the timing of air pressure information for multiple tires that is transmitted will vary. Such disruptions may be generated, for example, by running over a bump or level difference in the road. Therefore, the time that a receiver receives the air pressure information transmitted from the transmitters will vary in a pseudorandom fashion, so that it is not necessary to provide a specialized device (such as to generate random numbers) in order to vary the transmission time by the transmitters.

In one embodiment, a tire air pressure monitoring device is described for monitoring the air pressure of a tire mounted to a vehicle having two or more tires to be monitored. The air pressure monitoring device includes an air pressure sensing device that senses air pressure information of the tire and is adapted to be mounted at a prescribed position on the tire so as to rotate with the tire and a transmitting device that transmits the sensed air pressure information of the tire. A rotary position sensing device senses the rotary position of the air pressure sensing device as the tire rotates, a period of rotation calculating device calculates the period of rotation of the tire based on the rotary position sensed by the rotary position sensing device, a period of rotation disruption sensing device senses disruption in the period of rotation based on a change in the period of rotation calculated by the period of rotation calculating device, and a transmission control device outputs commands to transmit the air pressure information of the tire to the transmitting device based on a disruption in the period of rotation sensed by the period of rotation disruption sensing device.

In another embodiment, a tire air pressure monitoring device is described for monitoring the air pressure of a tire mounted to a vehicle having two or more tires to be monitored. The air pressure monitoring device includes an air pressure sensing means for sensing air pressure information of the tire and for mounting at a prescribed position on the tire so as to rotate with the tire and a transmitting means for transmitting the air pressure information sensed by the air pressure sensing means. The air pressure monitoring device further includes a rotary position sensing means for sensing the rotary position of the air pressure sensing means as the tire rotates, a period of rotation calculating means for calculating the period of rotation of the tire based on the rotary position sensed by the rotary position sensing means, a period of rotation disruption sensing means for sensing the disruption in the period of rotation based on a change in the period of rotation calculated by the period of rotation calculating means, and a transmission control means for outputting commands to transmit the air pressure information of the tire to the transmitting means based on a disruption in the period of rotation sensed by the period of rotation disruption sensing means.

In another embodiment, a method of monitoring the air pressure of a tire mounted to a vehicle having two or more tires to be monitored is described. The method includes sensing air pressure information of the tire, sensing the rotary position of the tire, calculating a period of rotation of the tire based on cyclical variation in the rotary position of the tire, sensing a disruption in the period of rotation based on a change in the calculated period of rotation, commanding a transmission of the air pressure information based on a sensed disruption in the period of rotation, and transmitting the air pressure information in response to the commanding of a transmission.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

First Embodiment

Figure 1:
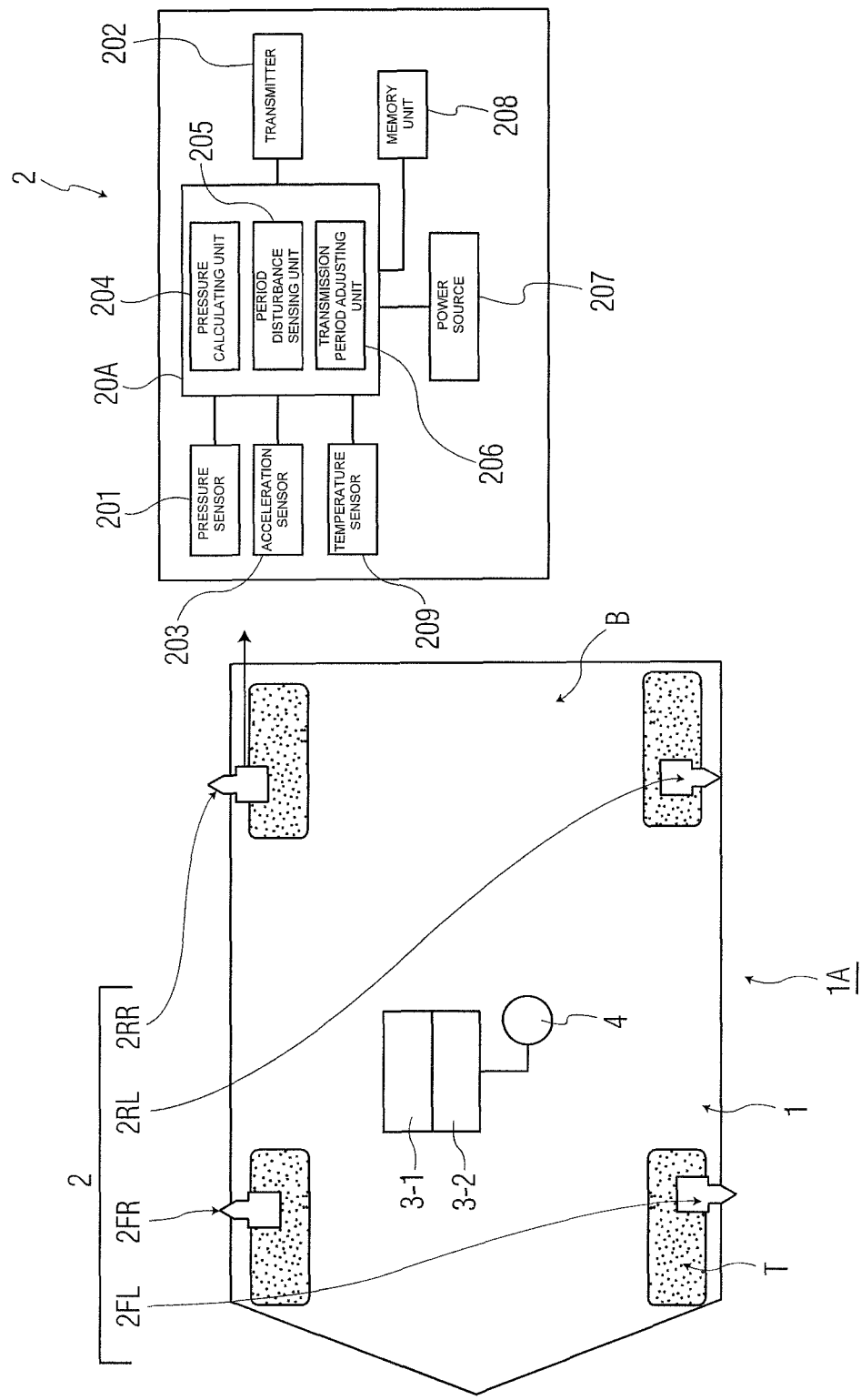
FIG. 1 is a schematic showing a first embodiment of a tire air pressure monitoring device.

FIG. 1 shows a tire air pressure monitoring device 1 provided in an automobile 1A. A transmitting unit 2 is mounted on each of the four tires T of the vehicle 1A, although it should be noted that the air pressure monitoring device 1 could equally be application to a vehicle having less than four tires (e.g., a motorcycle) or a vehicle having more than four tires (e.g., a tractor trailer). Specifically, a transmitting unit 2FL is provided for the front left tire T, a transmitting unit 2FR for the right front tire T, a transmitting unit 2RL for the left rear tire T, and a transmitting unit 2RR for the right rear tire T. Note that in the following description, when transmitting units 2FL, 2FR, 2RL, and 2RR are described in general and not differentiated, they are simply described as transmitting unit 2. As shown in further detail in FIG. 2, each transmitting unit 2 is includes a pressure sensor 201, a transmitter 202, an acceleration sensor 203, a period calculating unit 204, a period disruption sensing unit 205, a transmission period adjusting unit 206, a power source 207, a memory unit 208, and a temperature sensor 209. In the transmitting unit 2 shown in FIGS. 1 and 2, the period calculating unit 204, the period disruption sensing unit 205, and the transmission period adjusting unit 206 are integrated as an integrated circuit 20A.

The tire air pressure monitoring device 1 is installed on a chassis B of the automobile 1A. The air pressure monitoring device includes a receiver 3-1 that receives signals transmitted by the transmitter 202, a warning device 3-2 that generates a warning command after received signals that are decoded and compared with a threshold value are determined to be less than a prescribed air pressure, and an indicator 4 mounted in vehicle's the instrument panel and indicates to the driver that the air pressure is low, based on the warning command.

The transmitting unit 2 is described in further detail with reference to FIG. 2.

The pressure sensor 201 senses the air pressure in the tire T. In one embodiment, the pressure sensor 201 has a receiving section that distorts according to the tire pressure in tire T, and the amount of distortion is sensed as a change in electrostatic capacitance or a change in a resistance value. For example, the receiving section of the pressure sensor 201 may be a piezoelectric element.

The transmitter 202 transmits both the air pressure sensed by the pressure sensor 201 and identification number (ID) information wirelessly. The ID is based on a unique number stored by the memory unit 208 when the transmitting unit 2 is manufactured. The ID is encoded based on fixed rules, and is converted to AM waves or FM waves and transmitted. Otherwise, the signals transmitted by transmitter 202 that are discussed below specifically include pressure information.

The acceleration sensor 203 senses acceleration that occurs as a tire rotates.

The period calculating unit 204 extracts only a gravity component of the acceleration by passing through a bandpass filter the acceleration sensed by the acceleration sensor 203. The gravity component changes periodically from −1 G to 1 G synchronized with the tire rotation. To obtain such a signal, the acceleration sensor 203 has a sensing section that is installed to be downward vertically when the transmitting unit 2 is at the topmost position during rotation of the tire T. Because of this, the period calculating unit 204 senses that the transmitter 202 is at the topmost position on the tire if the extracted gravity component is 1 G. In the same way, the period calculating unit 204 can sense that the transmitter 202 is at a horizontal position on the tire if the extracted gravity component is 0 G, and can sense that the transmitter 202 is at the bottommost position on the tire if the extracted gravity component is −1 G. The period calculating unit 204 additionally senses the period during which a prescribed value between −1 G to 1 G is passed, for example 0.5 G, based on the extracted gravity component. The period calculating unit thus calculates a period T(n), where n is the count during the current calculation, and n−1 is the count during the previous calculation as described below.

Based on the period calculated by the period calculating unit 204, the period disturbance sensing unit 205 senses a transitory change in the period that occurs when the tire runs over a projection on the road while rotating. The magnitude of this transitory change is represented by an amount of period change ΔT. The period disturbance sensing unit 205 further determines that there is period disruption when a threshold amount of period change ΔT occurs. Note that amount of period change ΔT is calculated as the amount of change in period detected as the difference between the current period T(n) and the immediately preceding period T(n−1). In one embodiment, the criterion for determining period disruption uses the amount of change in period generated as a result of acceleration or deceleration of the vehicle as a threshold value.

The transmission period adjusting unit 206, based on the results of the determination by the period disturbance sensing unit 206, provides a transmission command using a sensed period disruption as a transmission period adjusted start time.

The power source 207 is a power source for driving the individual components the transmitting unit 2. The memory unit 208 stores the ID of the transmission unit 2. The ID is written at the time of manufacture. The temperature sensor 209 senses the temperature within the tire, measuring the change in the electrical resistance value of a resistor to generate a voltage that is correlated with temperature.

Figure 3:
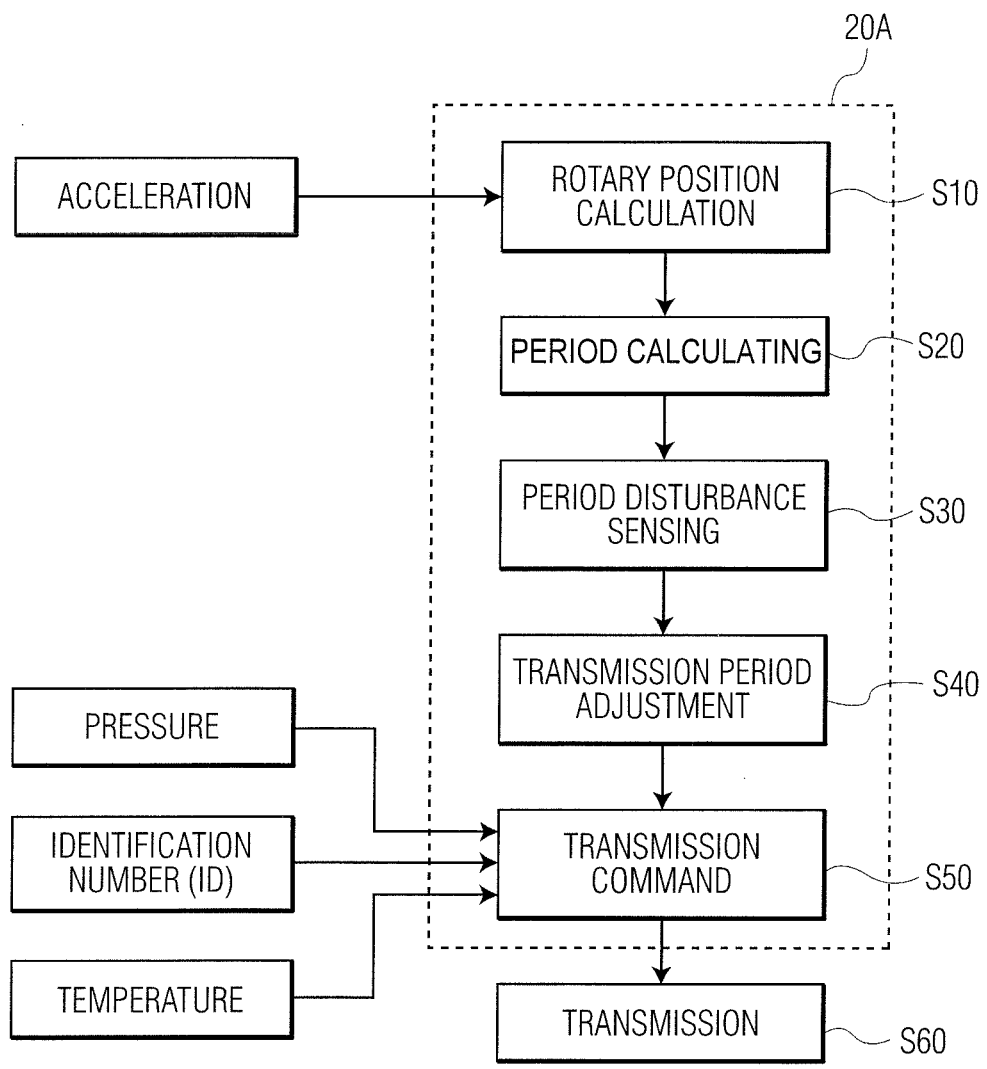
FIG. 3 is a process step diagram of the transmitting unit of FIG. 2.

FIG. 3 shows process steps executed by the period calculating unit 204, the period disruption sensing unit 205, and the transmission period adjusting unit 206. The process steps adjust the transmission time based on the period determined from the tire's rotary position. In one embodiment, process steps S10 and S20 are carried out by the period calculating unit 204, process step S30 is carried out by the period disruption sensing unit 205, and process steps S40 and S50 are carried out by the transmission period adjusting unit 206.

Figure 4:
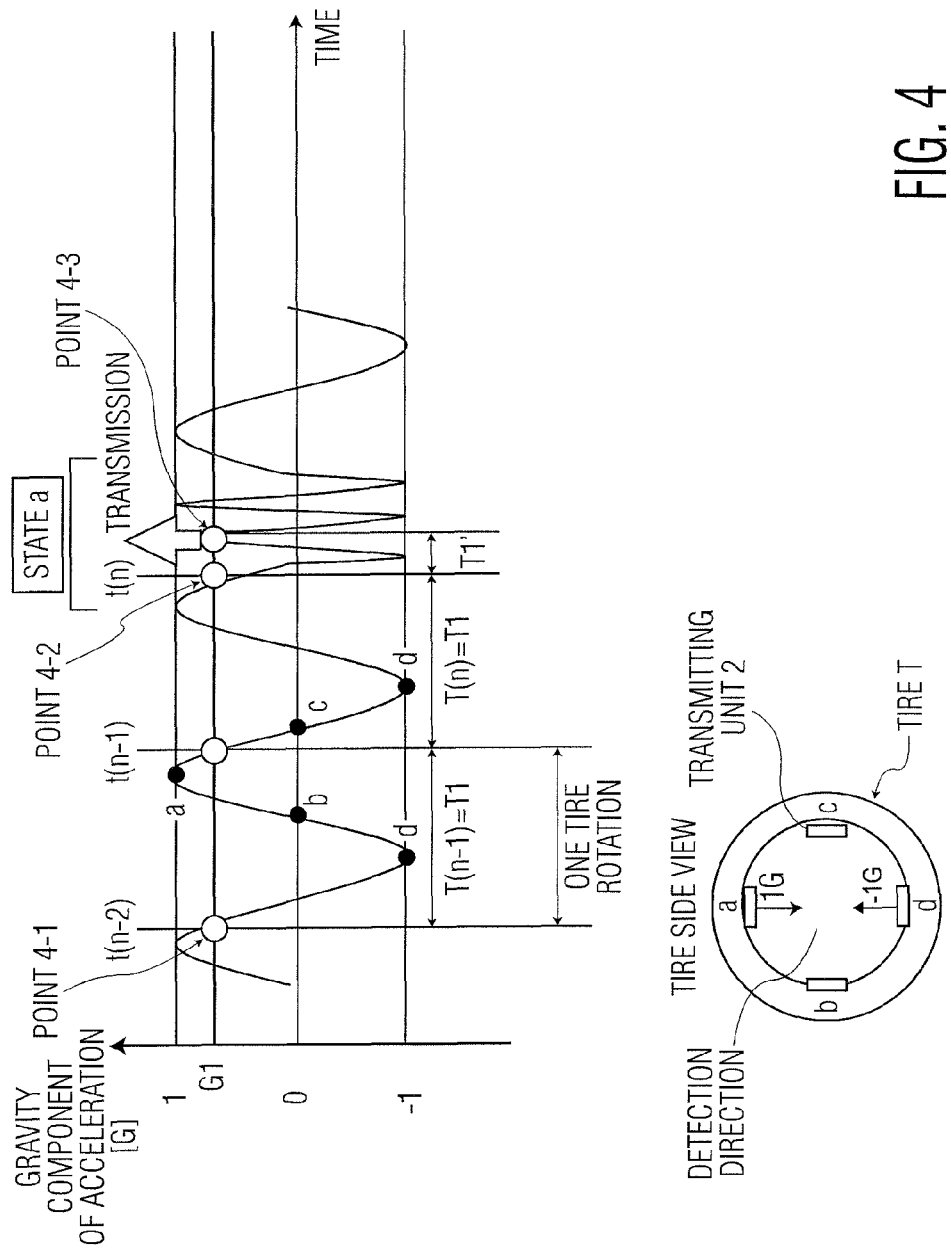
FIG. 4 is a timing chart showing changes in the gravity component sensed by an acceleration sensor mounted so as to rotate with a tire in the first embodiment.

FIG. 4 is a timing chart that shows changes in the gravity component of acceleration sensed by the acceleration sensor 203 when the tire rotates. The vertical axis represents the gravity component of the acceleration sensed by acceleration sensor 203, and the horizontal axis represents time.

The operation of the tire air pressure monitoring device 1 is explained below.

In FIG. 3, rotary position sensing step S10 calculates rotary position based on the acceleration sensed by the acceleration sensor 203. The period calculating unit 204 passes the acceleration sensed by the acceleration sensor 203 through a bandpass filter and extracts the gravity component when the tire rotates. The gravity component changes periodically from −1 G to 1 G synchronized with tire rotation. If the sensing section of the acceleration sensor 203, as shown in the tire side view in FIG. 4, is installed to be downward vertically at position a, the correspondence between the sine waveform of the gravity component and the position of the transmitting unit 2 is 1 G at point a (topmost position), 0 G at points b and c (horizontal position), and −1 G at point d (bottommost position).

Period calculating step S20 calculates the period synchronized to tire rotation based on the sine waveform of the gravity component extracted in the rotary position calculating step S10. The period calculating unit 204 senses the time t(n) at which a prescribed value G1 (0.5 G, for example) between −1 G and 1 G is passed from the sine waveform of the gravity component extracted in the period calculating step S10. Due to the tire rotating and the continual updating of the time t(n) each time the prescribed value G1 is passed, it is understood that t(n) becomes t(n−1), and t(n−1) becomes t(n−2), etc., over time. The difference T(n) between times t(n) and t(n−1), and the difference T(n−1) between times t(n−1) and t(n−2) are also updated in the same way. The period calculating unit 204 stores, during this updating, times t(n), t(n−1), t(n−2) and periods T(n) and T(n−1). The calculation formulas for periods T(n) and T(n−1) are represented by equations (1) and (2) below.

$$T(n)=t(n)-t(n-1) \text{(current period)} \quad (1)$$

$$T(n-1)=t(n-1)-t(n-2) \text{(previous period)} \quad (2)$$

Period disturbance sensing step S30 calculates the amount of period change. The period disruption sensing unit 205 calculates the amount of change (difference) ΔT between periods T(n−1) and T(n), and identifies and senses a range in which the amount of change exceeds the amount of period change Td generated by acceleration and deceleration of the vehicle, and is less than amount of period change Tx that represents noise. Noise is not used for control and is eliminated. The amount of period change ΔT is represented by equation (3) below, and the formula for identifying period disruption is represented by equation (4).

$$\Delta T=T(n-1)-T(n) \quad (3)$$

$$Td<\Delta T<Tx \quad (4)$$

Transmission period adjusting step S40 adjusts the transmission period based on a determination of the period disruption sensed during the period disturbance sensing step S30. The transmission period adjusting unit 206, based on the period disruption determination result of the period adjusting step S30, uses the determination period for the transmission period adjusted start time, and outputs a transmission command after a first prescribed time has elapsed from the transmission period adjusted start time. A preferred first prescribed time is 0, so that a transmission command is output immediately when period disruption is determined.

Transmission command step S50 organizes the pressure information in a predetermined information order or protocol for transmitting. After the transmission period adjusting unit 206 receives a transmission command in transmission period adjustment step S40, the pressure value sensed by the pressure sensor 201, the ID stored by the memory unit 208, and the temperature value in the tire sensed by the temperature sensor 209 are placed in the predetermined protocol information is generated for sending to the transmitter 202.

In transmission step S60, the transmitter 202 converts the information generated in the transmission command step S50 to AM waves or FM waves and transmits the waves.

Figure 5:
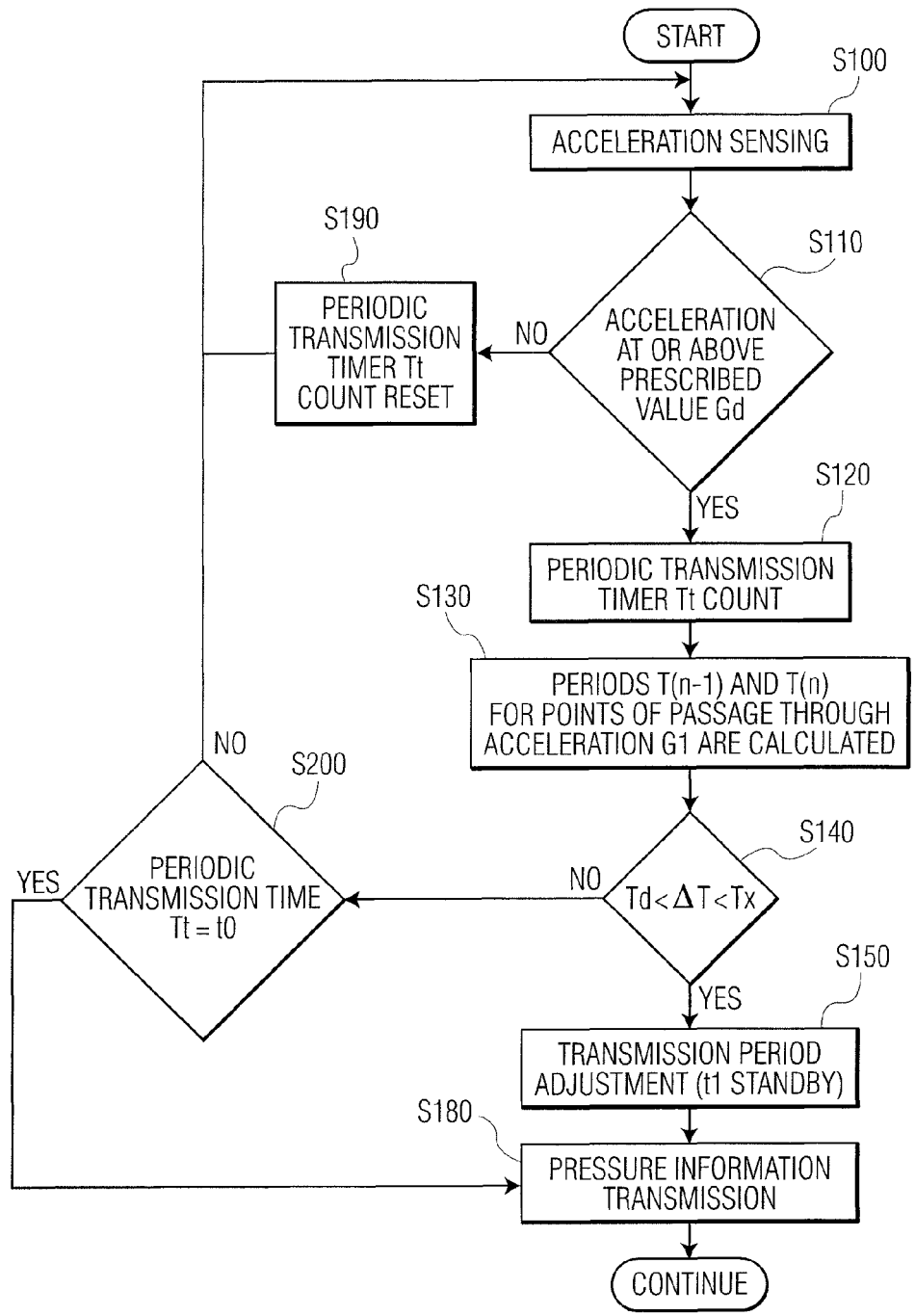
FIG. 5 is a control flowchart for the first embodiment.

FIG. 5 is a control flowchart that is executed by the process steps explained in conjunction with FIG. 3. Each process step executes processing repeatedly, as powered by the power source 207.

Step S100 and step S110 related to detecting the rotary position of rotary position calculation step S10. In step S100, an acceleration value is sensed to determine the send interval is determined according to whether the vehicle is moving or parked. In other words, the acceleration sensor 203 senses acceleration (G) as a proxy for the force applied to the tire.

In step S110, the acceleration sensed value and a threshold value Gd are compared. When the acceleration sensed value is at or above the threshold value Gd, a moving state is identified (YES at S110), and the process proceeds to step S120. On the other hand, when the acceleration sensed value is less than the threshold value Gd (NO at S110), processing proceeds to step S190, the period transmission timer Tt count is reset, and acceleration is sensed again at step S100.

In step S210, a periodic transmission timer Tt starts counting. This count is be used to provide an upper limit to the transmission interval by the transmitting unit 2. If the transmitting unit 2 does not sense period disruption before the count of the period transmission timer Tt reaches a period transmission time t0, the transmission period adjusting unit 206 issues a transmission command once the periodic transmission time t0 has been reached.

Step S130 corresponds to the period calculating step S20. The period calculating unit 204 extracts fluctuation (sine waveform) in the gravity component of acceleration sensed by the acceleration sensor 203, senses the period for which a prescribed value G1 is passed from the waveform to calculate the period T(n), and stores the current calculated period T(n) and the previous calculated period T(n−1). Period calculation is updated, and the period that is now T(n−2) is deleted.

Step S140 is determines the start of period disruption as in the period disturbance sensing step S30, based on equation (4). The period disruption sensing unit 205 calculates the amount of period change ΔT as the difference between previous period T(n−1) and current period T(n), and if ΔT exceeds the maximum value Td for amount of period change generated by acceleration or deceleration of the vehicle, it is recognized as period disruption. Note that in this embodiment, minimum amount of period change Tx that corresponds to the noise level is set in order to remove noise, and a period change Tx or greater is determined to be noise. That is, the range for amount of period change ΔT that corresponds to period disruption is set between Td and Tx. If amount of period change ΔT is within the set range, it is determined to be the start of period disruption (YES at S141), and process proceeds to step S150.

On the other hand, if ΔT is at or below Td at step S140, or if ΔT is Tx or greater (NO at S140), it is determined not to be the start of period disruption, and processing proceeds to step S200.

In step S150, the transmission period adjusting unit 206 adjusts the period transmission period based on the adjustment time t1, as in the transmission period adjustment step S40. In the case when t1 is zero, the transmission occurs immediately. At step S180, pressure information is generated, as in the transmission command step S50.

In step S200, the transmission period adjusting unit 206 determines whether period disruption has occurred within periodic transmission time t0 after the previous transmission based on the periodic transmission timer count Tt initiated by step S120. If a period disruption has occurred before the periodic transmission time t0 has expired, that is before the count for periodic transmission timer Tt counted has reached the periodic transmission time t0, a pressure information transmission would have occurred and the timer Tt would have been reset of reinitialized.

But if no period disruption has occurred within periodic transmission time t0 after the previous transmission, when the counter for periodic transmission timer Tt reaches periodic transmission time t0 (YES at step S200), the process proceeds to step S180, and pressure information is transmitted. Step S180 corresponds to the transmission step S60. If the periodic transmission time t0 has not been reached (NO at step S200), the process returns to step S100, and starting with acceleration sensing, calculation of the next period is performed.

With reference to FIG. 5, the control processing of process steps S10 through S60 was explained. Returning again to FIG. 4, a situation is explained below, concentrating on one tire, where the sensing of period disruption is used as the transmission period adjusted start time, and pressure information is sent after the transmission period adjusted start time.

In FIG. 4, between point 4-1 and point 4-2, the tire rotates normally without any input from projections, bumps, or grooves in the road surface. This rotational state is sensed as acceleration by the acceleration sensor 203, and the period calculating unit 204 extracts the gravity component of the acceleration, and calculates period T1 from the sinusoidal fluctuation in the gravity component. Next, between point 4-2 and point 4-3, the tire runs over a projection in the road surface and a transitory force is applied to the tire in the vertical direction. As a result, the period calculating unit 204 calculates a period T1' (from pint 4-2 to pinot 4-3) which is shorter than period T1 in a normal state in which the tire did not run over a projection in the road surface. Next, the period disruption sensing unit 205 identifies whether period T1' matches the range represented by equation (4) above (that is, whether the difference between T1' and T1 is longer than Td and shorter than Tx), and if it does, determines a period disruption start. In other words, if T1' meets the criteria, the period disruption sensing unit 205 senses a period disruption. The transmission time adjusting unit 206 uses the results of the period disruption sensing as the transmission period adjusted start time and starts counting of period disruption counter Ts. In this embodiment, the count time for the period disruption timer Ts is 0, and a command to transmit pressure information is given immediately after the period disruption is determined. This operation corresponds to S100→S110 (YES)→S140 (YES)→S150→S180 in the flowchart in FIG. 5.

Figure 6:
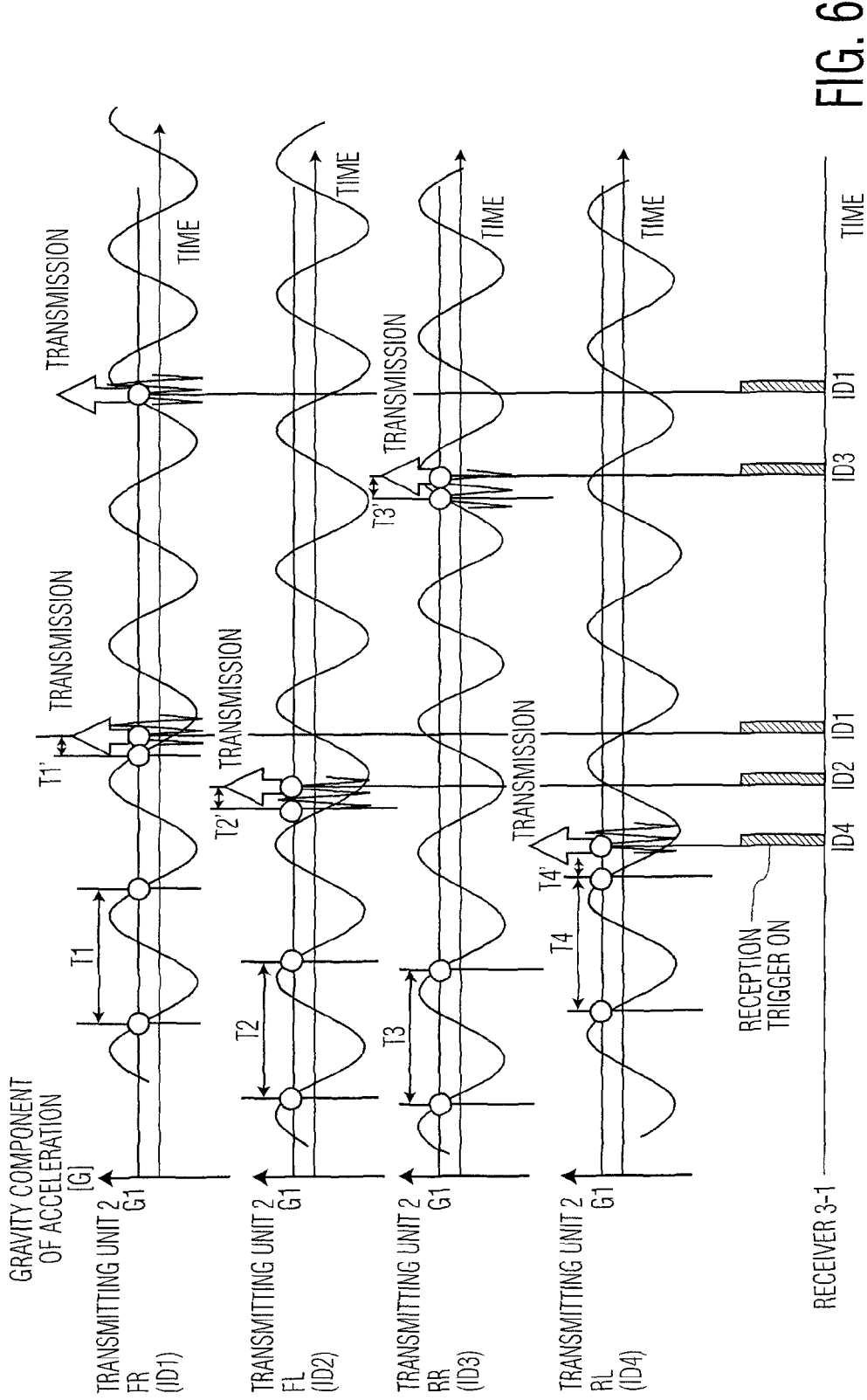
FIG. 6 it a timing chart of transmission for the first embodiment (transceiving mode)/

Above, with reference to FIG. 4, the transmission time adjustment method concentrating on one tire was explained. Next it will be described with reference to the timing chart of FIG. 6 the process by which pressure information (ID1-ID4) transmitted by the front, rear, left, and right tires mounted on a vehicle is received by one receiver 3-1. The horizontal axis represents time, and the vertical axis represents the acceleration gravity component for transmitting units 2FR, 2FL, 2RR and 2RL, and the reception period for receiver 3-1. In FIG. 6, forward travel by the vehicle is shown, and the period of rotation T1-T4 of each tire is roughly the same value. Periods T1'-T4' represent periods when period disruption is sensed. While the vehicle is moving, the front, rear, left and right tires roll over different road surfaces, so the shapes of projections run over by the tires or the run-over periods are different. Therefore, the transmission period adjusting unit 206 gives a transmission command using the period disruption generated such as by running over road surface projections as the transmission period adjusted start time. As a result, the receiver 3-1 can reliably receive pressure information (ID1-ID4) because the periods at which the pressure information is received from each of the tires are offset from one another (each period being the period for which adjustment start for the reception and transmission period is on for that tire).

Effects of the First Embodiment (1) The tire air pressure monitoring device in this embodiment includes the transmission period adjusting unit 206 that adjusts the transmission period using period disruption for the transmission period adjusted start time. Transitory road surface input that is input at different periods to the tires mounted at the front and rear, and left and right when the vehicle is moving is determined to be period disruption, and the transmission period of each tire is determined based on its own period disruptions. The result is that signals sent by the tires mounted at the front and rear, and left and right using road surface input that is input at different periods as the transmission period adjusted start time are received by one receiver with different reception periods, so the signals can be received reliably without being mixed together. For this reason, a specialized device, such as a pseudorandom number generator to adjust the transmission time, is not required in each tire-mounted transmitter, and the construction can be simplified.

(2) The tire air pressure monitoring device in this embodiment includes the acceleration sensor 203 that senses the rotary position of the tire by sensing the gravity component of force (G) applied to the tire. The detection direction of the acceleration sensor 203 in the transmitting unit 2 that is affixed inside the tire changes with rotation of the tire, and the gravity component sensed by the acceleration sensor 203 also changes in conjunction with this. The result is that the tire rotary position can be accurately sensed.

(3) The tire air pressure monitoring device in this embodiment includes the period calculating unit 204 that senses the period based on the output signal waveform (gravity component sine waveform) from the acceleration sensor 203. Transitory force input to the tire from the road surface can be extracted as a transitory change in the tire period of rotation, which differs from normal periodic changes in the gravity component accompanying tire rotation while moving. The result is that the period disruption sensing unit 205 can sense period disruption with good precision.

(4) The tire air pressure monitoring device in this embodiment includes the period disruption sensing unit 205 that captures tire rotation as periodic change in the gravity component, calculates the difference between the current and past periods, and determines that periodic change within a prescribed value range is period disruption. A transitory force input to the tire that disrupts the periodicity of fluctuation in the gravity component accompanying tire rotation can be captured as a period disruption. The result is that the transmitting unit 2 can send accompanying random input from the road surface that is input to the front, rear, left and right tires, and the reception period by receiver 3-1 can be effectively shifted.

(5) The tire air pressure monitoring device in this embodiment includes the transmission time adjusting unit 206 that is characterized in that it outputs a transmission command immediately using detection of period disruption as the transmission time adjusted start time. The receiver 3-1 can receive pressure information for each tire with no time delay based on road surface input received at different periods by the front, rear, left and right tires while moving.

Note that in the first embodiment, the number of times that pressure information is transmitted is one time after a period disruption is sensed, but the reception probability for the receiver can be improved by transmitting multiple times after each period disruption is sensed. In addition, in processing by the period disturbance sensing unit 205, period disruption is checked for each cycle in the flowchart in FIG. 5, but period disruption can also be determined by integrating and averaging the periods calculated over multiple cycles.

Second Embodiment

The second embodiment, in contrast with the first embodiment, transmits pressure information using the ending of the disruption period as the transmission period adjusted start time. Additionally, when the period disruption time is extremely long, a time-out time is set accompanying it so that there is no transmission delay, and pressure information is forcibly sent if the period disruption does not end by the time that the time-out is reached.

Figure 7:
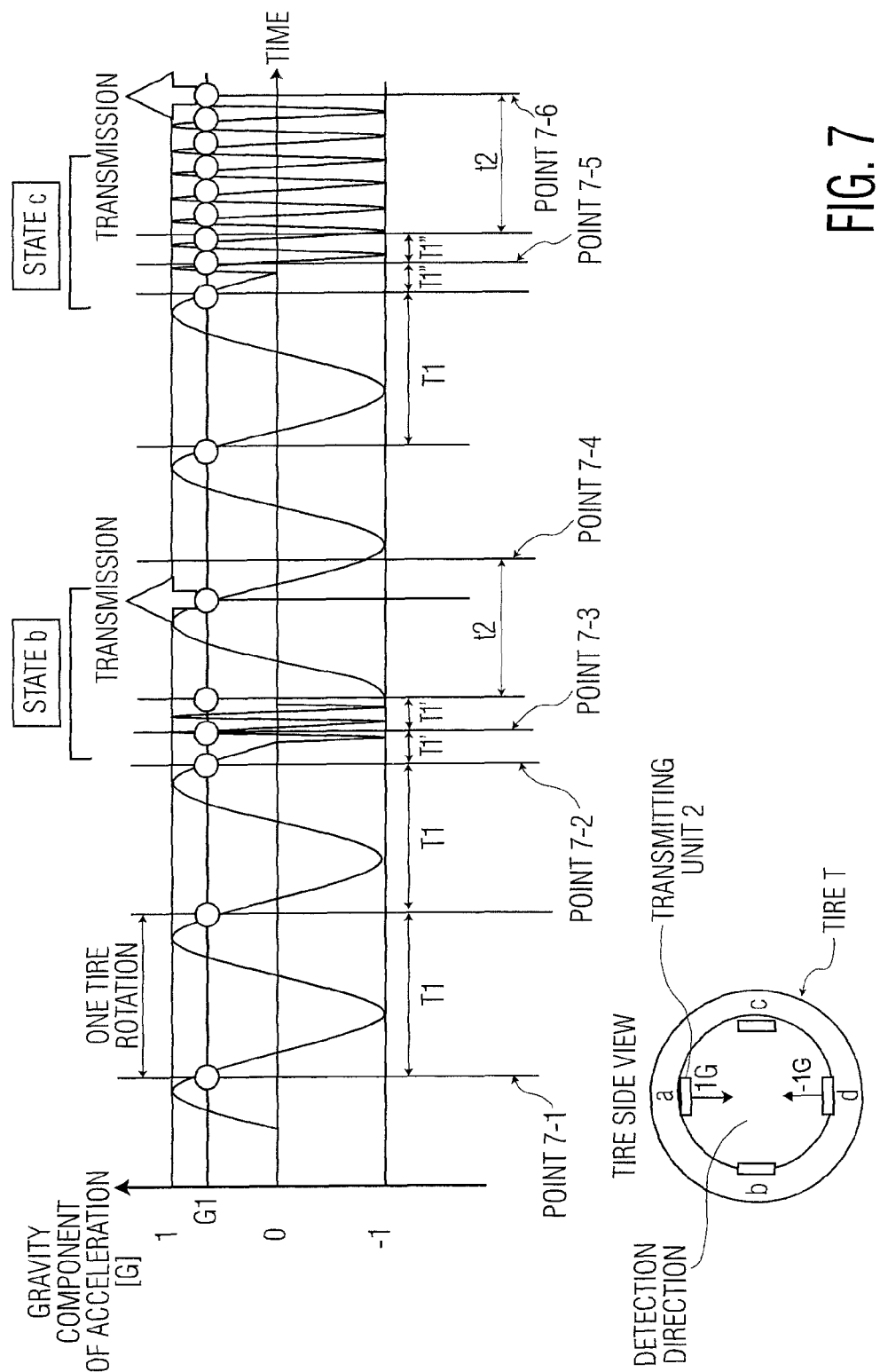
FIG. 7 is a timing chart showing changes in the gravity component sensed by an acceleration sensor mounted so as to rotated with a tire in a second embodiment.

In FIG. 7, state b where period disruption ends within time-out time t2, and state c where period disruption does not end within time-out time t2 are represented with a timing chart. First, state b is explained in time sequence. From point 7-1 to point 7-2, the tire is rotating normally. This rotational state is sensed as acceleration by the acceleration sensor 203, and the period calculating unit 204 extracts the acceleration gravity component and calculates period T1 from fluctuation in the gravity component (sine waveform). When the tire runs over a projection or groove in the road surface, transitory force is input in the vertical direction. From point 7-2 to point 7-3, the period calculating unit 204 calculates the transitory input as period T1' that is shorter than period of rotation T1. The period disruption sensing unit 205 calculates the amount of period change ΔT from the difference between period T1 and period T1', identifies whether it matches a range that is greater than the absolute value |Td| (the minimum threshold to detect a period disruption) and smaller than the absolute value |Tx| (the maximum threshold value of a period disruption that is not considered to be noise) in equation (4) above, and if so, determines it to be the start of period disruption. That is, the period disruption sensing unit 205 senses the start of period disruption and transmits the sensed result to the transmission period adjusting unit 206. The transmission period adjusting unit 206 starts the counting of a timer (period disruption timer) for determining the end of the period disruption using the result as the transmission period adjusted start time. Before point 7-4, a ΔT in the range of the absolute value |Td| and the absolute value |Tx| in equation (4) above is matched within the timeout time t2, so period disruption has ended, and the transmission period adjusting unit 206 generates pressure information using that point in time as the transmission period adjusted start time. Next, the transmitter 202 converts the pressure information to an AM wave or FM wave and sends it.

Next state c is explained. When a tire runs over a projection or groove in the road surface, at point 7-5, fluctuation in the gravity component sensed by the acceleration sensor 203 is calculated by the period calculating unit 204 as period T1", that is shorter than period of rotation T1. The period disruption sensing unit 205 calculates amount of period change ΔT as the difference between period T1 and period T", and transmits the sensing (determination) result to the transmission period adjusting unit 206. The transmission period adjusting unit 206 uses the result as the transmission period adjusted start time and starts counting of the period disruption timer. Next at point 7-6, it is determined that period disruption has not ended within timeout time t2, so pressure information is sent at that point in time.

Figure 8:
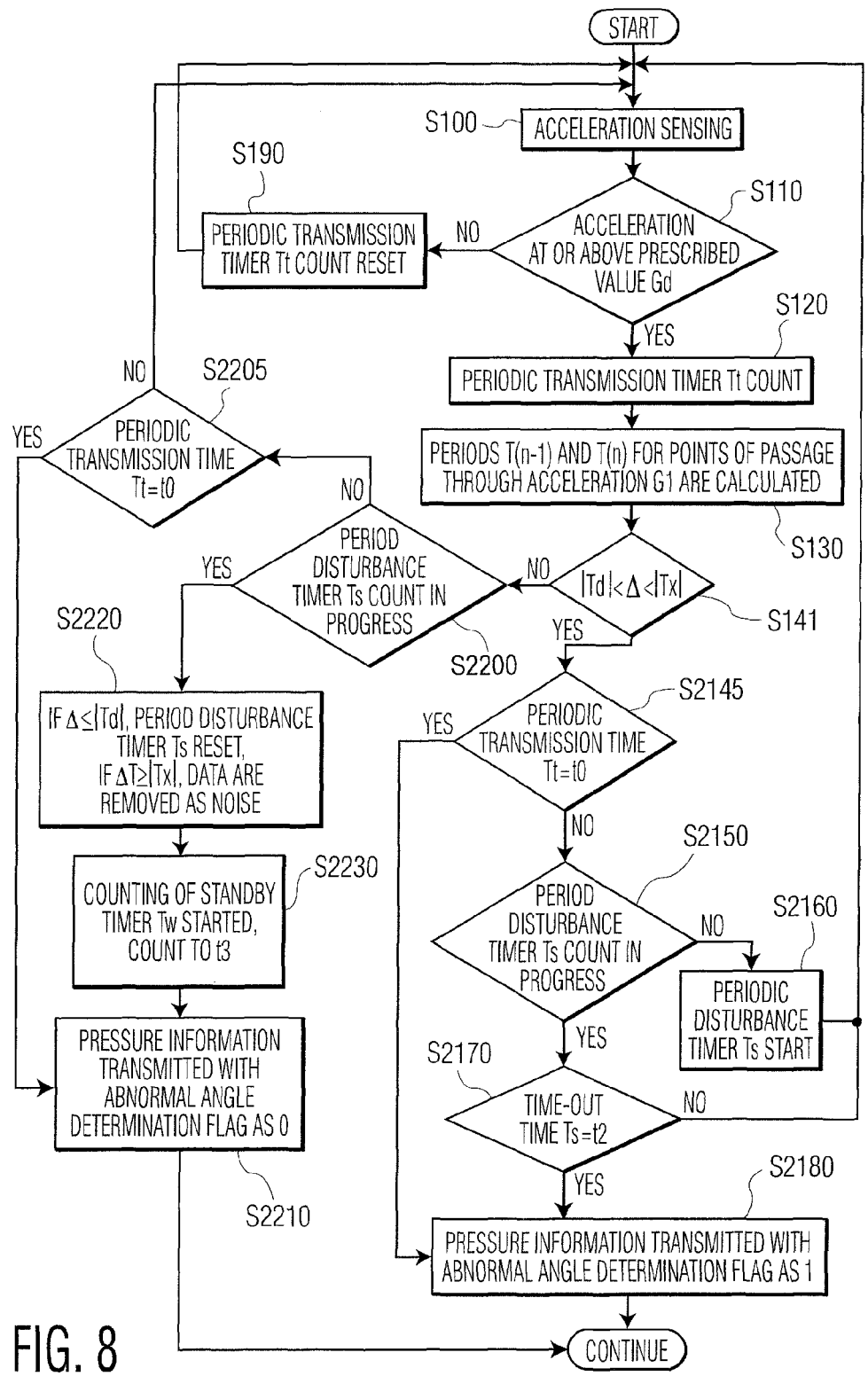
FIG. 8 is a control flowchart for the second embodiment.

FIG. 8 is a flowchart for the control executed by this embodiment. The steps that differ from FIG. 5 (starting with step S141) are explained.

Step S141 determines whether or not there is a period disruption from the length of the period. The period disruption calculating unit 205 calculates the amount of period change ΔT as the difference between previous period T(n−1) and current period T(n), and determines that there is period disruption when amount of period change ΔT is greater than the absolute value |Td| of the maximum value for the amount of period change generated with acceleration or deceleration of the vehicle. Note that with this embodiment, the absolute value |Tx| for the minimum period change that corresponds to the noise level is set in order to remove noise, and if the period change is |Tx| or greater, this is determined to be noise. That is, period disruption is set between |Td| and |Tx|. If the amount of disruption period change ΔT is within the range of these values, the start or end of a disruption period is then determined (YES at S141), and the process proceeds to step S2145.

On the other hand, if ΔT is |Td| or less, or if ΔT is |Tx| or greater (NO at S140), it is determined not to be the start or end of a disruption period, and the process proceeds to step S2200.

The control flow when the start or end of period disruption is sensed (starting at step S2145) is explained. Step S2145 determines whether pressure information has been transmitted within periodic transmission time t0 in order to ensure reception probability by receiver 3-1. At step S2145, if it is determined that the period transmission timer Tt that is counted at step S120 above has not reached t0 (NO at S2145), the process proceeds to step S2150. Step S2150 monitors the continuation of period disruption. When the period disruption timer Ts is already being counted, that is, when period disruption was sensed with sensing of the previous period disruption (YES at S2150), the process proceeds to step S2170.

Step S2170 determines whether the timeout time t2 has been reached. When timeout has been reached (YES at S2170), the process proceeds to step S2180, and the transmission period adjusting unit 206 sets an abnormal angle judgment flag to a value of 1 (abnormal). Setting the abnormal angle judgment flag to 1 (abnormal) indicates that the period disruption has not ended. In step S2170, when the timeout time t2 has not yet elapsed (NO at S2170), the process returns to step S100, and the next period is calculated starting from sensing of acceleration. The flow in steps S2145-S2180 corresponds to state c in FIG. 7.

On the other hand, when the period disruption counter Ts has not yet been counted at step S2150, that is, when the start of period disruption has not been sensed with the current period disruption sensing (NO at S2150), the process proceeds to step S2160, and counting of period disruption timer Ts is started using this period as the transmission period adjusted start time. The process then returns to S100 to restart from sensing of acceleration and to monitor whether or not there is a period disruption.

If the periodic transmission period t0 has been reached at the point when period disruption is sensed (YES at S2145), periodic transmission is given priority. Consequently, the process proceeds directly to step S2180 to set the abnormal angle judgment flag at 1 (abnormal) to indicate that period disruption is continuing, and pressure information is transmitted.

Next, the state going from step S141 to step S2200 is explained. Step S2200 determines whether the disruption counter Ts is being counted. If the disruption counter Ts is being counted, the process proceeds to step S2220, indicating that a period disruption is continuing. In other words, it is determined (YES at 2200), in the same way as with step S2150 above. In step S2220, the count of period disruption timer Ts is reset if $\Delta T$ is |Td| or less. If $\Delta T$ is |Tx| or greater, it is judged to be noise and the period data are excluded from control.

Next, at step S2230, the transmission period adjusting unit 206 starts counting of a standby timer Tw for transmission period adjustment, given that the period disruption has ended. After a second prescribed time t3 has elapsed, the process proceeds to step S2210 and pressure information is sent with the abnormal angle judgment flag set to 0 (normal).

Note that in the second embodiment, the second prescribed time for standby timer Tw may be set to zero 0 so that there is transmission immediately after a period disruption ends. Setting the abnormal angle judgment flag to 0 (normal) indicates that there is no period disruption. The flow in steps S2200-S2210 corresponds to state b in FIG. 7.

If the disruption counter Ts is not being counted (NO at step S2200) the process proceeds to step S2205, which determines whether the periodic transmission timer Tt has reached the periodic transmission time t0. If t0 has been reached (YES at S2205), the process proceeds to step S2210, and the abnormal angle judgment flag is set to 0 (normal). On the other hand, if t0 has not been reached at step S2205, the process returns to step S100, and the next period is calculated starting from acceleration sensing.

Figure 9:
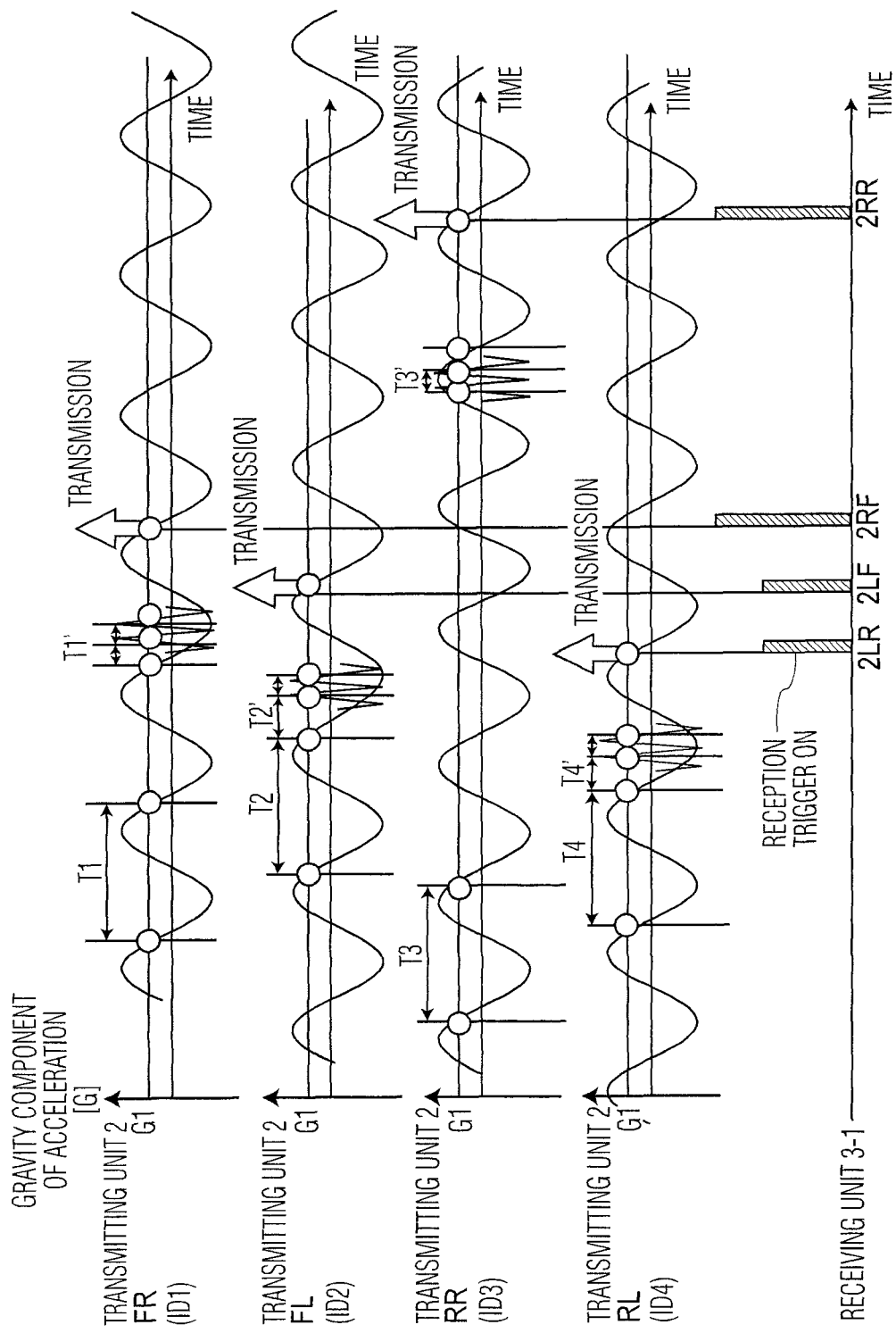
FIG. 9 is a timing chart of transmission in the second embodiment (transceiving mode).

A method of adjusting the transmission period when period disruption is sensed was explained with a timing chart and processing flow concentrating on one tire in FIGS. 7 and 8 above. Next, with reference to FIG. 9, the operation of the vehicle in the second embodiment is shown with a timing chart. The axes in FIG. 9 are the same as in FIG. 6, and the difference from FIG. 6 is that the transmission period adjusting unit 206 transmits using the determination that period disruption has ended as the transmission period adjusted start time. Transmission is started at the point when period disruption ends, so the transmission period for each wheel is shifted. As a result, the receiver 3-1 can reliably receive ID1 to ID4 from transmitting units 2 at offset reception periods.

Figure 10:
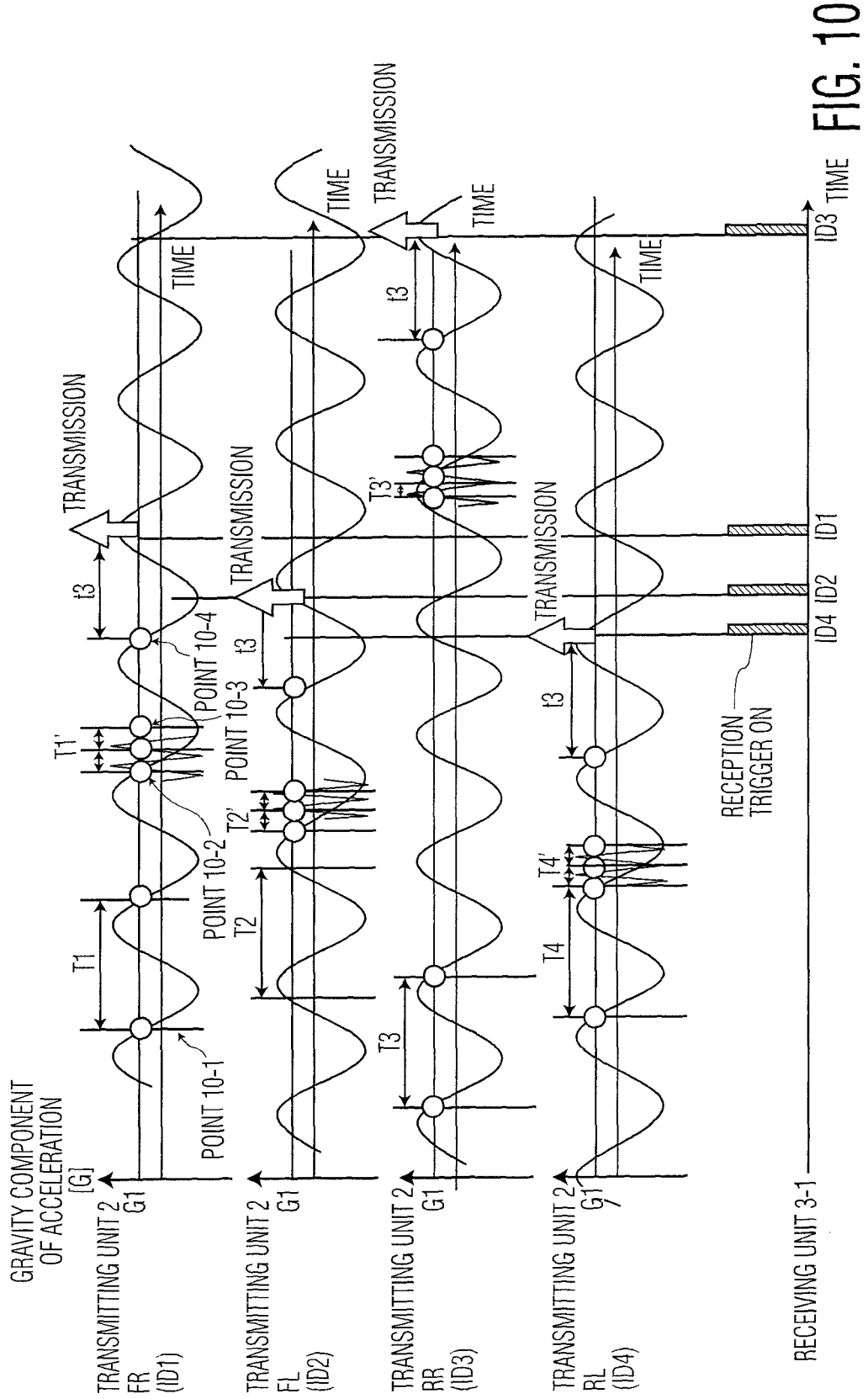
FIG. 10 is a timing chart of transmission in a variation of the second embodiment (transceiving mode).

Note that as a variation of the second embodiment, the standby time can be set to second prescribed time t3 rather than 0. This operation is explained using FIG. 10. FIG. 10 shows the operation of a vehicle with a variation of the second embodiment in the same way as FIG. 9. Looking at right front tire 2FR shown in the uppermost graph in FIG. 10, from point 10-1 to point 10-2, the tire is rotating in a normal state (period T1). From point 10-2 to point 10-3, when there is input to the tire produced by a projection on the road surface, the gravity component of acceleration gives a transitory period, and the period disruption sensing unit 205 senses a period disruption T1' at point 10-3. At point 10-4, when the period disruption ends, the transmission period adjusting unit 206 starts counting of standby timer Tw for transmission period adjustment, and pressure information is generated after the second prescribed time t3 has elapsed. Operation is performed in the same way with the other tires (2FL, 2RR, 2RL).

With the operation above, while the vehicle is moving, the front, rear, left and right tires roll over different road surfaces, so the shapes of the projections the tires run over and the periods for which they run over them are different. Therefore, the transmission period adjusting unit 206 gives a transmission command using the ending of the period disruption generated by running over a projection on the road surface as the transmission period adjusted start time, so the receiver 3-1 can reliably receive pressure information for each tire due to the shift in the period at which each signal is sent (period that reception and transmission period adjusted start time is on).

As another variation, the second prescribed time t3 can be set as s prescribed period of rotation c3. Thus, when the period of rotation is shortened at high speed, for example, the standby time can also be shortened, and the transmission frequency can be increased. The result is that the reception frequency by the receiver 3-1 can be improved with high-speed travel, and reliability can be ensured.

Figure 11:
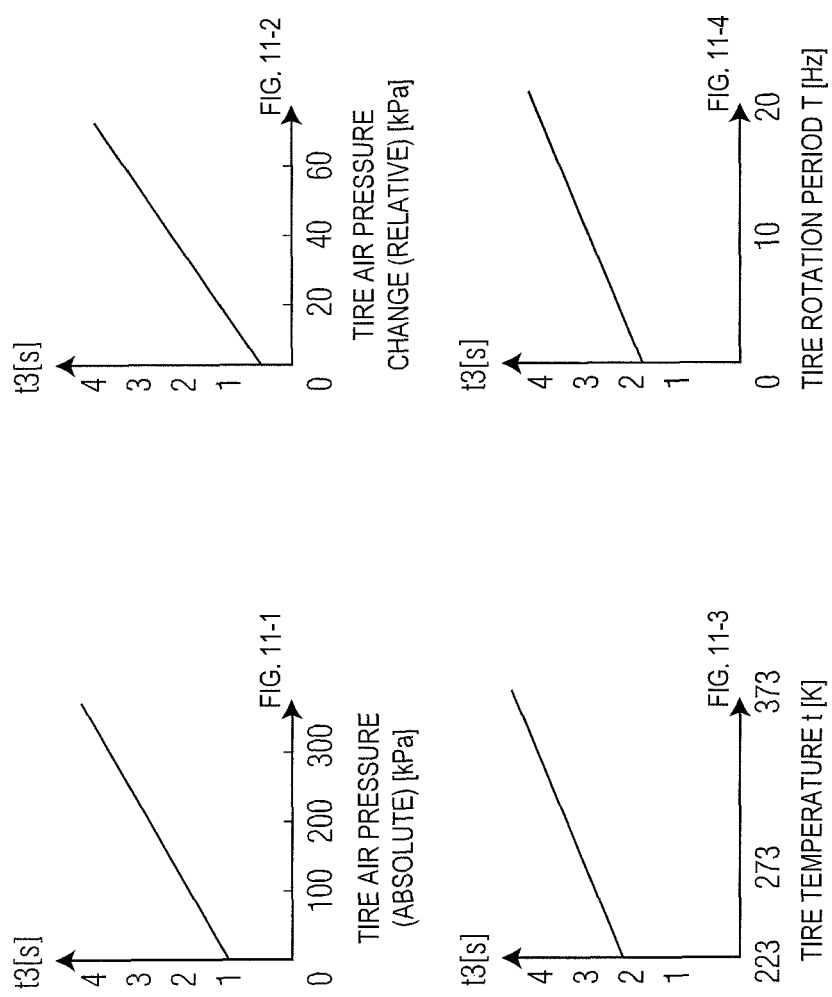
FIG. 11 is a series of graphs used for setting a second prescribed time t3 with respect to the tire state in the second embodiment.

As still another variation, the second prescribed time t3 can be changed while matched with the tire state as shown in FIG. 11. In FIG. 11, relationships between the standby time for transmission period adjustment explained above and tire parameters are shown. FIG. 11-1 shows the relationship between the tire air pressure sensed by the pressure sensor 201 and the prescribed time t3. The horizontal axis represents tire air pressure P, and the vertical axis represents the second prescribed time t3. Based on FIG. 11-1, the second prescribed time t3 is lengthened as tire pressure P is higher.

Figure 2:
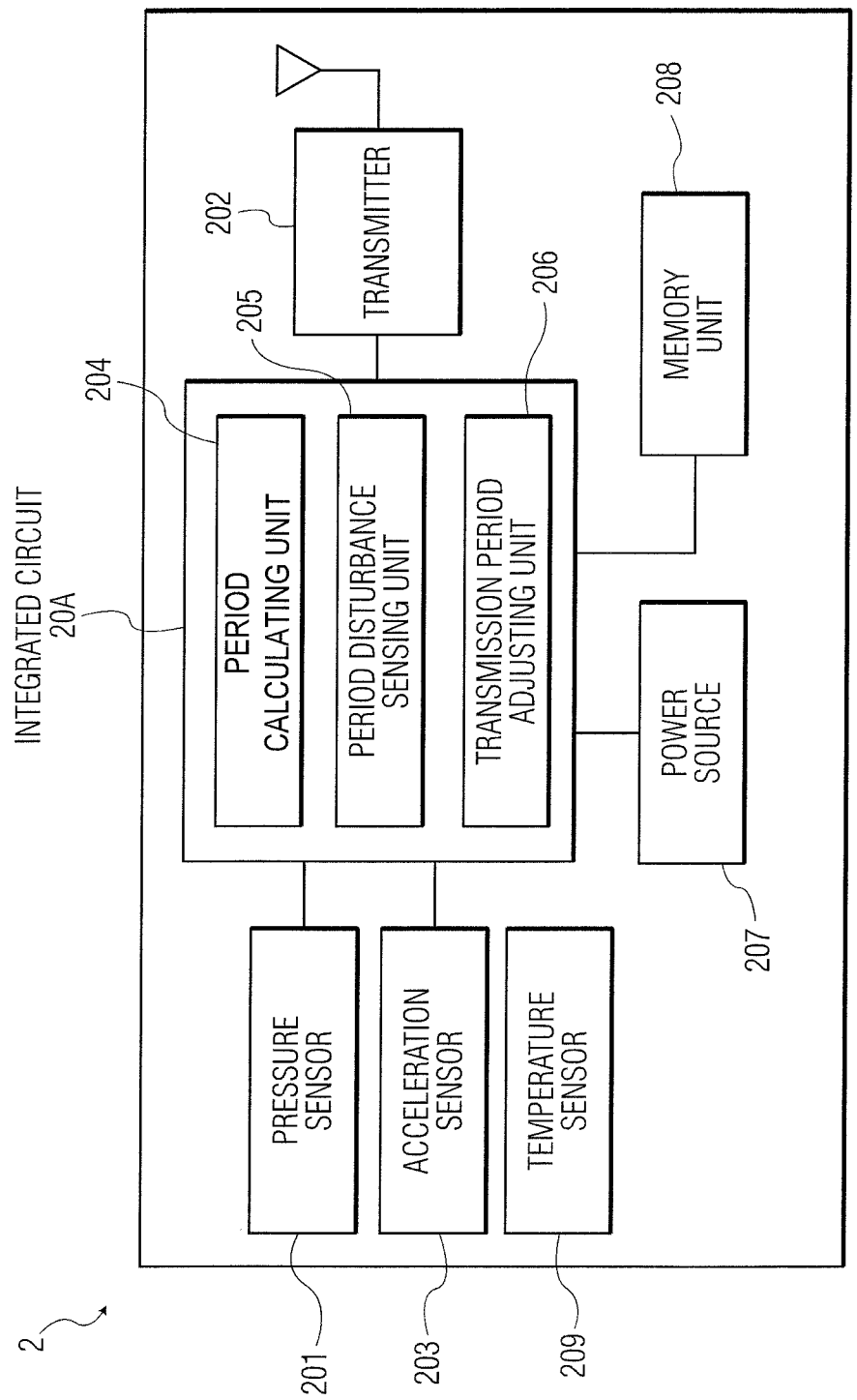
FIG. 2 is a schematic showing a transmitting unit of the embodiment of FIG. 1.

FIG. 11-2 shows a correspondence between a change $\Delta P$ in air pressure (on the horizontal axis) and the prescribed time t3, using a reference point of the tire air pressure when a constant centrifugal force (2 G, for example) is applied to the transmitting unit 2 after the vehicle starts moving. The second prescribed time t3 is lengthened as $\Delta P$ is higher.

FIG. 11-3 shows a correspondence between the prescribed time t3 and ire temperature t sensed with the temperature sensor 209. The second prescribed time t3 is lengthened as the tire temperature t is higher. The contact road surface shape, or other state, differs between the front, rear, left and right tires, so the tire temperature generated by friction between the road surface and the tire differs. It is possible to change the sending period for the transmitting unit 2 mounted on each tire by utilizing this difference.

FIG. 11-4 shows the relationship between tire period of rotation T and the prescribed time t3. The second prescribed time t3 is lengthened as the tire period of rotation T is higher. In the left and right tires, the period of rotation T is shorter on the outside wheel than the inside wheel when turning, and in the front and rear tires, period of rotation T is shorter with the drive wheel than the driven wheel, so if the second prescribed time t3 is determined based on the difference between the periods of rotation T, the sending periods can be shifted comprehensively.

The operation by the vehicle using transmission period adjustment according to the tire state explained above is explained with the timing chart in FIG. 12. Looking at the right front tire 2FR shown in the uppermost graph in FIG. 12, from point 12-1 to point 12-2 the tire is rotating in a normal state. When there is input to the tire from the road surface at point 12-2, it is sensed as period disruption at point 12-3. After the period disruption ends at point 12-4, a tire parameter (temperature, air pressure, period of rotation) is sensed, THE second prescribed time t3$fr$ is set, and then there is transmission at point 12-5 when the relevant time is reached. This is processed in the same way with the other tires (2FL, 2RR, 2RL).

The mounting positions of the tires mounted on a vehicle vary between front, rear, left and right, so the projection shape of the road surface that each tire runs over and the periods at which they run over them differ. In addition, the friction with the road surface applied to the front, rear, left and right tires differ according to acceleration/deceleration and turning when the vehicle is moving, so the air pressure of each tire, the temperature, and the period of rotation also differ. The second prescribed time t3 for transmission period adjustment (t3$fr$, t3$fl$, t3$rr$, t3$rl$) can be set to a different value depending on the tire parameters (temperature, pressure). From the above, the transmitting unit 2 can send pressure information at the period disruption end period and the transmission period adjustment period for each tire can be varied, so that the receiver 3-1 can receive multiple sets of pressure information with one receiver by the reception periods being offset.

Figure 12:
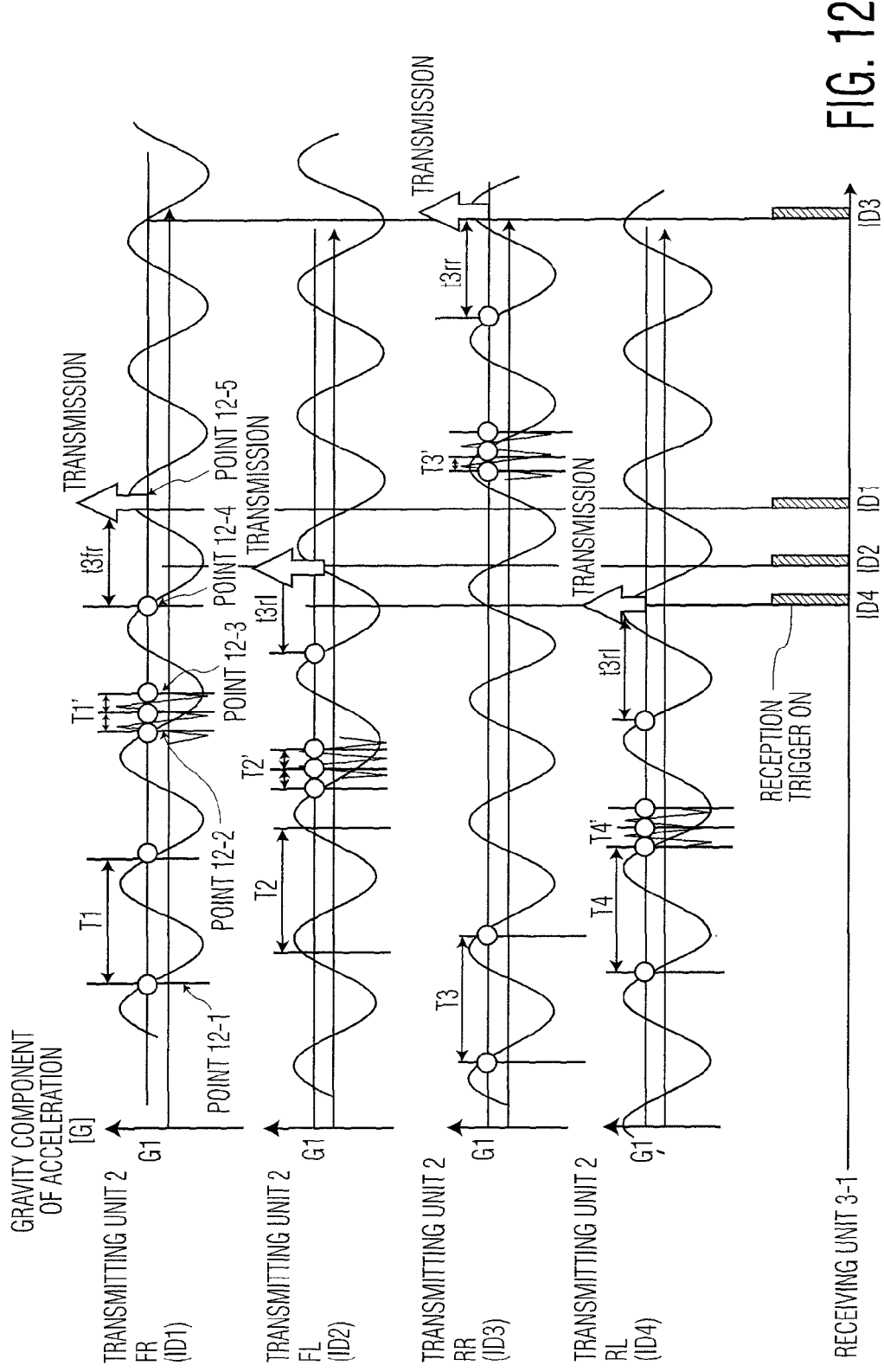
FIG. 12 is a timing chart of transmission in a variation of the second embodiment (transceiving mode).

In FIGS. 11 and 12, an embodiment was described in which the transmission period is adjusted for each tire with the point at which period disruption ends as the transmission period adjusted start time. Note that this additional variation could also be applied to the first embodiment.

Effects of the Second Embodiment (1) The tire air pressure monitoring device in this embodiment includes the transmission period adjusting unit 206 that outputs a transmission command using the ending of period disruption as the transmission period adjusted start time. Therefore, the device stands by without transmitting while a period disruption continues, and a transmission command is output after the period disruption ends. The result is that signals transmitted at the point when transitory input to the front and rear, and left and right tires while moving ends are received by one receiver with different reception periods, so the signals can be reliably received without being mixed together. For this reason, a specialized device, such as a pseudorandom number generator, to adjust the transmission period is not required, and the construction can be simplified.

(2) The tire air pressure monitoring device in this embodiment includes the transmission period adjusting unit 206 that outputs a transmission command when a second prescribed time t3 has elapsed after a disruption period has ended, using the disruption period as the transmission period adjusted start time, so pressure information can be generated after the disruption period has definitely ended.

(3) The tire air pressure monitor device in this embodiment includes the transmission period adjusting unit 206 that outputs a transmission command after a prescribed period is reached after period disruption ends, so the period of rotation will be shorter when the speed of travel is higher, where reception precision is even more necessary. Thus, the transmission interval can be shortened, the transmission frequency can be increased, and the reception reliability at high speeds can be increased.

(4) The tire air pressure monitor device in this embodiment includes the transmission period adjusting unit 206 that sets second prescribed time t3 based on at least one parameter—tire air pressure, tire temperature, or period of rotation—after period disruption ends to adjust the transmission period. Thus, the transmission period for the second prescribed time t3 can shift with each wheel, since the parameters of the front and rear, and left and right, tires mounted in the vehicle vary when moving. In addition, transmission periods according to the tire state can be set in advance in a memory unit, and the transmission period adjusting unit 206 can vary the transmission period based on them, with the result that another device for shifting the transmission periods is not required, and construction can be simplified.

Note that with this embodiment, with the determination of the start of period disruption, an initial amount of disruption period change ΔT' is not determined to be period disruption. This is for the purpose of improving the reliability of determination of period disruption. The present invention is not limited to this functionality, and the initial amount of disruption period change ΔT' could be determined to be the start of period disruption.

In addition, with this embodiment, amount of period change ΔT is calculated as the amount of change (difference) between periods $T(n-1)$ and $T(n)$ as shown in equation (3), but it could also be calculated as the ratio of $T(n-1)$ and $T(n)$.

Note that the objective of using pressure information set with an abnormal angle judgment flag explained in the first and second is so that ID recording precision is improved by using pressure information when there is no period disruption. A device that can favorably implement this objective is a tire air pressure monitoring device to which is added a function to record the IDs for the transmitting units 2 for tire position by correlating a fixed tire angle of rotation and the angle of a wheel speed sensor on the vehicle.

As mounted to a vehicle device includes multiple tires T, the pressure sensor 201 (the air pressure sensing means) mounted to each tire T, the transmitter 202 (the transmitting means) mounted to each tire T, the receiver 3-1 (the receiving means) mounted remotely from the tires T, the period calculating unit 204 (the rotational position sensing means and the period of rotation calculating means), the period disruption sensing unit 205 (the period of rotation disruption sensing means), and the transmission period adjusting unit 206 (the transmission control means).

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tire air pressure monitoring device for monitoring the air pressure of a tire mounted to a vehicle having two or more tires to be monitored, comprising:
   an air pressure sensing device that senses air pressure information of the tire and is adapted to be mounted at a prescribed position on the tire so as to rotate with the tire;
   a transmitting device that transmits the sensed air pressure information of the tire;
   a rotary position sensing device that senses the rotary position of the air pressure sensing device as the tire rotates;
   a period of rotation calculating device that calculates the period of rotation of the tire based on the rotary position sensed by the rotary position sensing device;
   a period of rotation disruption sensing device that senses disruption in the period of rotation based on a change in the period of rotation calculated by the period of rotation calculating device; and
   a transmission control device that outputs commands to transmit the air pressure information of the tire to the transmitting device based on a disruption in the period of rotation sensed by the period of rotation disruption sensing device.

2. The tire air pressure monitoring device of claim 1, further comprising:
   a receiving device that receives the air pressure information transmitted by the transmitting device.

3. The tire air pressure monitoring device of claimed 1, wherein the rotary position sensing device comprises an acceleration sensor that senses acceleration, and wherein the rotary position is sensed based on the sensed acceleration.

4. The tire air pressure monitoring device of claim 1, wherein the period of rotation disruption sensing device compares the current period of rotation with a preceding period of rotation, and determines that disruption has occurred in the period of rotation when a change is sensed in the period of rotation that is equal to or greater than a predetermined amount.

5. The tire air pressure monitoring device of claim 1, wherein the transmission control device outputs a command to transmit the air pressure information to the transmitting device when a disruption in the period of rotation is sensed.

6. The tire air pressure monitoring device of claim 1, wherein the transmission control device outputs a command to transmit the air pressure information to the transmitting device when a disruption in the period of rotation ends.

7. The tire air pressure monitoring device of claim 1, wherein the transmission control device outputs a command to transmit the air pressure information to the transmitting device when a prescribed time has elapsed after a disruption in the period of rotation is sensed.

8. The tire air pressure monitoring device of claim 7, wherein the transmission control device determines the prescribed time based on at least one of tire air pressure, tire temperature, or period of rotation.

9. A tire air pressure monitoring device for monitoring the air pressure of a tire mounted to a vehicle having two or more tires to be monitored, comprising:
- an air pressure sensing means for sensing air pressure information of the tire and for mounting at a prescribed position on the tire so as to rotate with the tire;
- a transmitting means for transmitting the air pressure information sensed by the air pressure sensing means;
- a rotary position sensing means for sensing the rotary position of the air pressure sensing means as the tire rotates;
- a period of rotation calculating means for calculating the period of rotation of the tire based on the rotary position sensed by the rotary position sensing means;
- a period of rotation disruption sensing means for sensing the disruption in the period of rotation based on a change in the period of rotation calculated by the period of rotation calculating means; and
- a transmission control means for outputting commands to transmit the air pressure information of the tire to the transmitting means based on a disruption in the period of rotation sensed by the period of rotation disruption sensing means.

10. A method of monitoring the air pressure of a tire mounted to a vehicle having two or more tires to be monitored, comprising:
- sensing air pressure information of the tire;
- sensing the rotary position of the tire;
- calculating a period of rotation of the tire based on cyclical variation in the rotary position of the tire;
- sensing a disruption in the period of rotation based on a change in the calculated period of rotation;
- commanding a transmission of the air pressure information based on a sensed disruption in the period of rotation; and
- transmitting the air pressure information in response to the commanding of a transmission.

* * * * *